(12) United States Patent
Marahrens

(10) Patent No.: US 9,912,222 B2
(45) Date of Patent: Mar. 6, 2018

(54) CIRCUIT CONFIGURATION AND SYSTEM OF CAPACITORS

(71) Applicant: SEW-EURODRIVE GMBH & CO. KG, Bruchsal (DE)

(72) Inventor: Klaus Marahrens, Waldbronn-Reichenbach (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 14/386,263

(22) PCT Filed: Mar. 4, 2013

(86) PCT No.: PCT/EP2013/000622
§ 371 (c)(1),
(2) Date: Sep. 18, 2014

(87) PCT Pub. No.: WO2013/139433
PCT Pub. Date: Sep. 26, 2013

(65) Prior Publication Data
US 2015/0103570 A1    Apr. 16, 2015

(30) Foreign Application Priority Data
Mar. 22, 2012  (DE) .................. 10 2012 005 622

(51) Int. Cl.
*H02M 1/12* (2006.01)
*H02M 7/217* (2006.01)
*H02M 7/00* (2006.01)

(52) U.S. Cl.
CPC ............. *H02M 1/12* (2013.01); *H02M 1/126* (2013.01); *H02M 7/003* (2013.01); *H02M 7/217* (2013.01); *H02M 2001/123* (2013.01)

(58) Field of Classification Search
CPC ........ H02M 1/12; H02M 1/126; H02M 7/217; H02M 7/003; H02M 7/48;
(Continued)

(56) References Cited

U.S. PATENT DOCUMENTS 3,739,300 A   6/1973  Tyre
5,164,893 A   11/1992 Lüscher et al.
(Continued)

FOREIGN PATENT DOCUMENTS

CN    101 976 850    2/2011
DE         97943      5/1973
(Continued)

OTHER PUBLICATIONS

International Preliminary Report on Patentability, mailed Oct. 2, 2014, issued in corresponding International Application No. PCT/EP2013/000622.
(Continued)

*Primary Examiner* — Gustavo Rosario Benitez
(74) *Attorney, Agent, or Firm* — Andrews Kurth Kenyon LLP

(57) ABSTRACT

A circuit configuration and system of capacitors for a converter having a filter system, the circuit configuration including a converter, which has an alternating voltage connection, especially for a multiphase input- or output-side alternating voltage source, and a unipolar connection on the input or output side, especially a direct voltage connection, especially for a voltage intermediate circuit, the alternating voltage connection being connected to phase lines, especially to three phase lines, the phase lines having inductances, in particular, characterized in that first capacitances are situated between a phase line and a common star point in each case, it being the case, in particular, that one of the first capacitances is situated between a particular phase line,
(Continued)

especially each phase line, and the common star point, it being the case, in particular, that each of the first capacitances is of equal size.

34 Claims, 8 Drawing Sheets

(58) Field of Classification Search
CPC .... H02M 2001/123; H02M 7/12; H02M 1/14; H02M 1/143; H02M 5/40
See application file for complete search history.

(56) References Cited

U.S. PATENT DOCUMENTS

| | | | |
|---|---|---|---|
| 5,345,375 A * | 9/1994 | Mohan | H02J 3/01 307/105 |
| 5,499,178 A * | 3/1996 | Mohan | H02J 3/01 307/105 |
| 5,999,423 A | 12/1999 | Steinke et al. | |
| 6,075,425 A * | 6/2000 | Gopfrich | H02M 1/12 307/105 |
| 6,208,537 B1 * | 3/2001 | Skibinski | H02M 1/12 363/40 |
| 6,456,516 B1 | 9/2002 | Bruckmann et al. | |
| 6,583,628 B2 | 6/2003 | Dubhashi et al. | |
| 6,583,682 B1 | 6/2003 | Dubhashi et al. | |
| 8,115,444 B2 * | 2/2012 | De | H02P 27/08 318/801 |
| 8,488,319 B2 | 7/2013 | Santos | |
| 2010/0177452 A1 * | 7/2010 | Wei | H02P 29/02 361/111 |
| 2010/0320992 A1 | 12/2010 | Dearn | |
| 2012/0044029 A1 * | 2/2012 | Kaimi | H02M 1/44 333/181 |
| 2013/0114206 A1 | 5/2013 | Schramm | |
| 2013/0194838 A1 * | 8/2013 | Jang | H02M 1/4216 363/37 |

FOREIGN PATENT DOCUMENTS

| | | |
|---|---|---|
| DE | 40 23 687 | 1/1992 |
| DE | 19637290 A1 | 3/1998 |
| DE | 29800567 U1 | 4/1998 |
| DE | 198 33 491 | 2/2000 |
| DE | 100 19 696 | 10/2001 |
| DE | 103 10 577 | 9/2004 |
| DE | 102005019215 A1 | 11/2006 |
| DE | 10 2009 053 583 | 3/2011 |
| DE | 10 2010 009 265 | 8/2011 |
| DE | 10 2010 028 927 | 11/2011 |
| EP | 0 899 859 | 3/1991 |
| JP | 2000-224862 | 8/2000 |
| JP | 2006-020394 | 1/2006 |
| JP | 2007-259688 | 10/2007 |
| JP | 2007-325377 | 12/2007 |
| JP | 2009-111435 | 5/2009 |
| WO | 2008/092152 | 7/2008 |

OTHER PUBLICATIONS

International Search Report, dated Apr. 22, 2013, issued in corresponding International Application No. PCT/EP2013/000622.
J. Franz, EMV—Störungssicherer Aufbau elektronischer Schaltungen, 3. Auflage, "Chapter 8", pp. 219-223, Studium (2008). English-language machine translation provided.

* cited by examiner

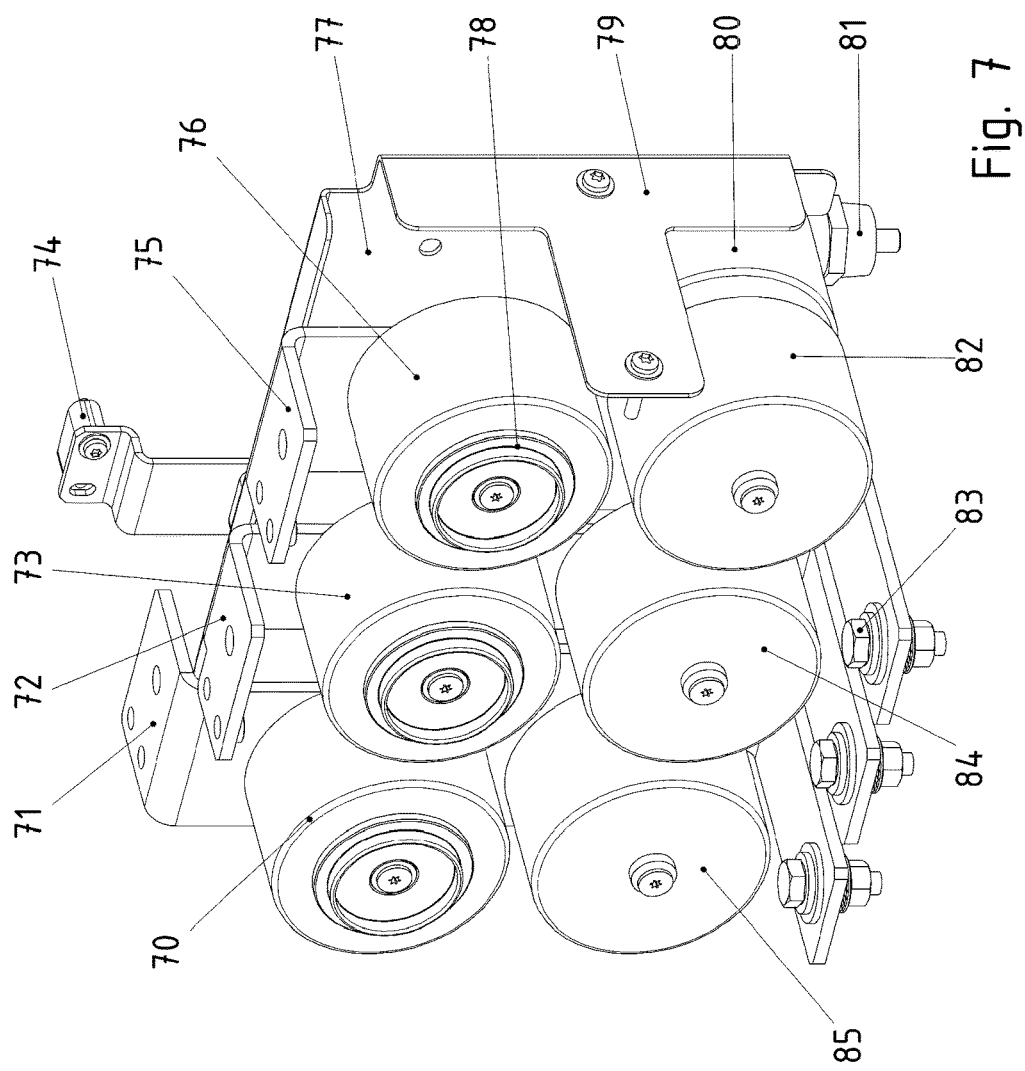

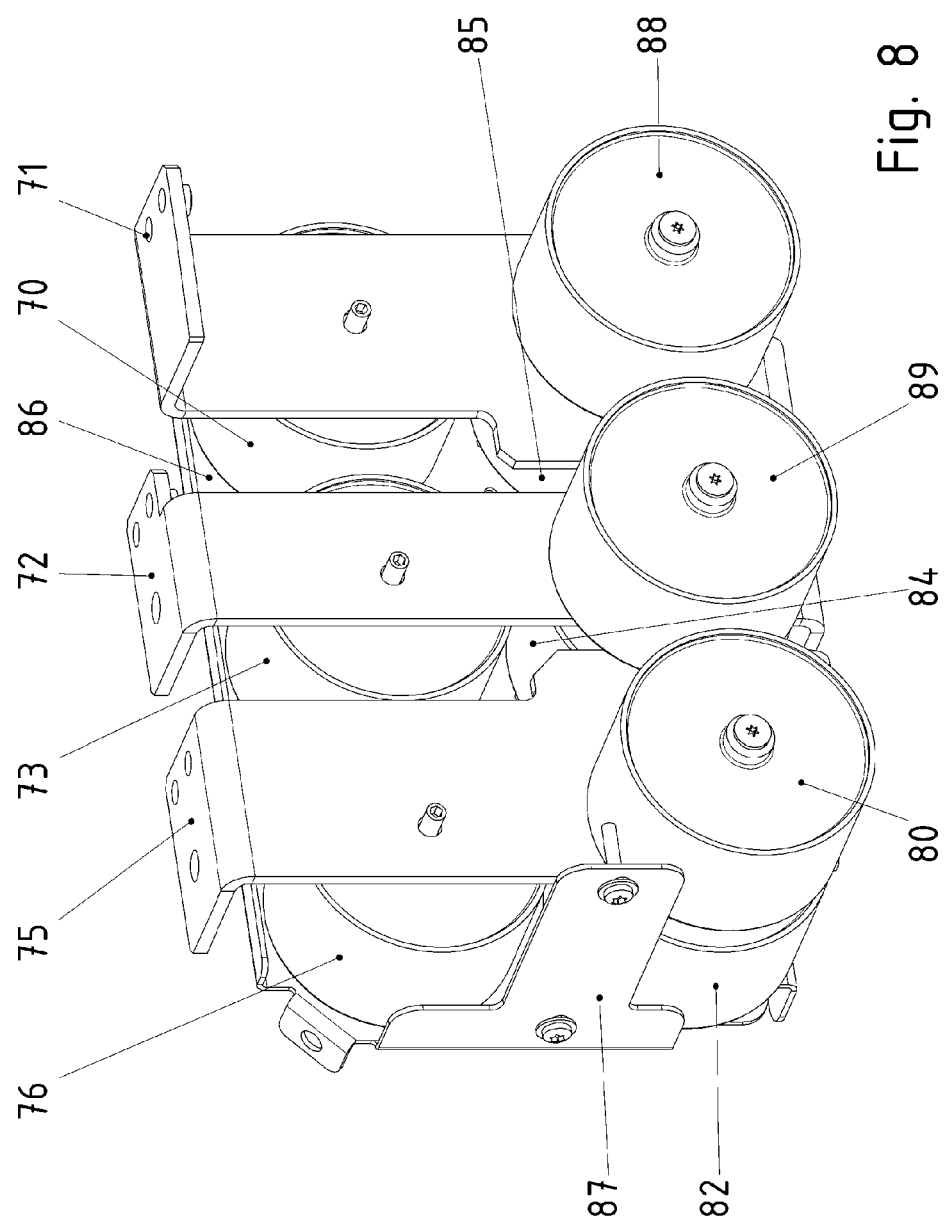

CIRCUIT CONFIGURATION AND SYSTEM OF CAPACITORS

FIELD OF THE INVENTION

The present invention relates to a circuit configuration and a system of capacitors.

BACKGROUND INFORMATION

Converters having a voltage intermediate circuit and an inverter downstream from the voltage intermediate circuit are known from the printed publication EP 0 899 859 B1. The inverter supplies a three-phased alternating voltage at its outputs. A filter system connects the output terminals of the inverter and the voltage intermediate circuit. The filter system includes a filter choke connected in series with the output terminals and a filter capacitor which leads from each output terminal to a common capacitor star point.

EP 0 899 859 B1 teaches in paragraph [0006] that only the pure three-phase voltage systems are filtered. If one were to connect the capacitor star point directly to a center tap located between two intermediate circuit capacitors, then the direct voltage system is indeed filtered as well, but disadvantages result with regard to the system technology. Without additional measures, the filter system is constantly excited to natural oscillations. As taught in paragraph [0007] of EP 0 899 859 B1, only a regulation that intervenes in the switching sequence of the inverter can damp these natural oscillations without losses.

These natural oscillations are caused by the series resonant circuit made up of the filter chokes and the filter capacitors that are connected to the common capacitor star point.

According to paragraph [0007] of EP 0 899 859 B1, the switching sequence of the inverter is nowadays usually defined by a control computer, which determines the switching commands for the power switches based on the load conditions. The control computer normally operates in only two coordinates because of the symmetry of the output, from which the switching states of the three phases are able to be determined. The three phases are decoupled in the filter circuit. A resonance regulation thus must be performed using three independently acting control circuits. The resonance regulation thus is no longer easily able to be integrated into the load regulation. However, since both parts of the control access the same control variable, they cannot operate in a decoupled manner.

Also disadvantageous in the afore-described circuit of EP 0 899 859 B1 is the high additional current loading of the intermediate circuit capacitors and the inverter, which results especially at low switching frequencies of the inverter-semiconductor switches from the charge reversal of the filter capacitors by the direct voltage system.

As disclosed in FIG. 5 of EP 0 899 859 B1, the capacitor star point is connected to the voltage intermediate circuit via an RC element formed by a resistor, which is connected in series with a capacitor.

The printed publication JP 2000 224862 A shows an energy conversion device.

The printed publication DE 10 2010 009 265 A1 shows an inverter.

The printed publication JP 2007 259688 A shows a three-phased rectifier.

The printed publication US 2010 0320992 A1 shows a PWM converter having a sample and hold circuit.

The printed publication DD97943 describes a circuit configuration for flame monitoring of motor-independent heating devices, which are operated at a direct current or alternating current source and use liquid fuels.

The publication DE 100 19 696 A1 shows a method and a circuit for reducing interference radiation in engine supply switching applications.

DE 10 2010 028 927 A1 shows a power electronics system.

DE 40 23 687 A1 shows a power converter system.

WO 2008 092152 A2 shows a common mode filter and a differential mode filter for a frequency converter.

DE 10 2009 053 583 A1 shows a power converter system having a modular design.

SUMMARY

The present invention is based on the objective of further developing a circuit configuration and a system of capacitors, for which high reliability is to be achieved at a low outlay in costs.

The present invention corresponds to a circuit configuration for a converter having a filter system that includes a converter, which is provided with an alternating voltage connector, especially for a multiphase input- or output-side alternating voltage source, and a unipolar connector on the input or output side, especially a direct voltage connector, especially for a voltage intermediate circuit, the alternating voltage connector being connected to phase lines, especially to three phase lines, the phase lines having inductances, in particular, first capacitances being situated between a phase line and a common star point in each case, it being the case, in particular, that one of the first capacitances is situated between a particular phase line, especially each phase line, and the common star point, a series circuit of capacitances being connected to the unipolar connector and having a center tap, the start point being connected in an electrically conductive manner to the center tap in the voltage intermediate circuit, especially by means of a local neutral conductor, and at least one third capacitance being switched in parallel with the series circuit.

This has the advantage that a high-frequency potential reference is established between an alternating voltage segment and a direct voltage segment of the circuit. This potential reference is utilized to suppress potential jumps between the alternating voltage segment and the direct voltage segment of the circuit. These potential jumps are the result of the switching pattern of the converter. Interference currents resulting from stray capacitances of the circuit configuration are usually dissipated via a ground cable, which is under a heavy load by the interference currents, especially given a high switching frequency. The ground cables are therefore unloaded with the aid of the circuit configuration according to the present invention.

The star point is advantageously connected directly to the center tap. This makes it possible to achieve a short circuit without a voltage drop for very high frequency currents in the kilohertz range.

The present invention therefore provides a filter system made up of the first capacitances together with the third capacitance and the inductances in the phase lines. The natural oscillations of this filter system are essentially defined by the second capacitances. With the aid of the second capacitances of the filter system, which are able to be reduced by the large third capacitance, they are shifted in their frequency to frequencies in which no excitation of oscillations by the network and/or the converter takes place. This makes the interference effect on the converter very slight, and no additional control is required.

As a result, high performance reliability of the converter is provided by the circuit configuration according to the present invention, while the switching outlay is able to be reduced at the same time. The environment is therefore better protected as well.

In one advantageous development, each of the first capacitances is of equal size. This has the advantage that interference in the three phase lines is suppressed to the same extent, which makes it possible to optimally dissipate the interference currents.

In one advantageous development, the series circuit is made up of two capacitances, especially two capacitances of equal magnitude. This is advantageous insofar as both capacitances are charged and discharged uniformly. This ensures a long service life of the capacitors and thereby improves the reliability. At the same time, an equilibrium between the upper and the lower intermediate circuit potential is able to be adjusted.

In one advantageous development, the individual phase line, especially each phase line, has a series circuit of inductances, especially inductances of a power line filter, the individual phase line, in particular each phase line, including a center tap. This has the advantage that the capacitances of the circuit configuration can be decoupled from the alternating voltage network, i.e., the alternating voltage source, by means of the inductances, the capacitances being able to be decoupled from parasitic components in the system voltage, in particular. Especially harmonic oscillations as parasitic components of the system voltage can be decoupled from the capacitances. This makes it possible to prevent resonant vibrations between the capacitances and the network impedances.

In one advantageous development, the center tap is situated between two inductances. This has the advantage that the capacitances are able to be decoupled from the alternating voltage source, and feedback is also preventable by the converter.

In one advantageous development, the inductance disposed on the network side from the center tap is a line inductance or a series circuit made up of the line inductance and the filter choke inductance. This is advantage insofar as the circuit expenditure can be reduced with the aid of the line inductance, which means that resources may be saved and the impact on the environment be lessened.

In one advantageous development, the capacitance of the third capacitance is greater than the capacitance of each of the second capacitances, the capacitance of the third capacitor preferably being greater by at least a factor of ten than the capacitance of each of the second capacitances. This has the advantage that the third capacitance stores the major portion of the energy of the direct current intermediate circuit, while voltage jumps and interference currents are compensated for via the smaller capacitances, without causing unacceptably high losses. In addition, by selecting the ratio of the capacitances of the third to the capacitances of the second capacitors according to the present invention, it is possible to shift the frequency of the possibly arising resonant vibrations to a frequency range that poses no risk to the stability of the circuit of the converter.

In one advantageous development, a further filter connects the local neutral conductor to the earth potential in an electrically conductive manner, the further filter being developed as a capacitor, in particular. It is advantageous in this regard that high-frequency interference currents are able to be dissipated in a reliable manner. The current losses by the filter are minimizable.

In one advantageous development, a series circuit of a fourth capacitance and a resistor is disposed parallel to each first capacitance. This is advantageous inasmuch as occurring oscillations are able to be damped by the resistor.

In one advantageous development, a series circuit of a fourth capacitance and a resistor is disposed parallel to each first capacitance. This has the advantage that the filter system functions both as a short circuit for interference currents having very high frequencies and as a damping means for interference currents having average frequencies, the capacitors blocking low-frequency currents, so that they pass the converter. The damping of the interference currents having average frequencies makes it possible to prevent a resonance catastrophe resulting from natural oscillations of the resonant frequency of the circuit.

In one advantageous development, the series circuits are identical to each other. This has the advantage that interference on the three phase lines is able to be eliminated and oscillations are damped in the same way. Voltages and currents are therefore evenly distributed to the lines.

In one advantageous development, the capacitance of the individual fourth capacitances is smaller in each case than the capacitance of the respective first capacitances; in particular, the capacitance of a fourth capacitance is at least less than one half the capacitance of the respective first capacitance and greater than one tenth of the capacitance of the respective first capacitance, the capacitance of a fourth capacitance preferably being less than one half the capacitance of the respective first capacitance and greater than one fourth of the respective first capacitance. This has the advantage that a high-frequency resonance is able to be damped and the loss currents can be kept small with the aid of the resistor.

In one advantageous development, the local neutral conductor is a sheet-metal panel, which is connected in an electrically conductive manner to a terminal of the respective first and second capacitances, and mechanically supports the capacitors constituting or having the respective capacitances. It is advantageous in this context that the sheet-metal panel, which essentially constitutes a two-dimensional planar conductor, features very low inductance in comparison with conductor cables, which are essentially one-dimensional conductors. This makes it possible to minimize resonant vibrations with the aid of the capacitors. The use of the local neutral conductor as holding means makes it possible to reduce the required components because no additional wiring is necessary, which is better for the environment.

In one advantageous development, the local neutral conductor is made up of multiple parts. This is advantageous inasmuch as the local neutral conductor is able to be produced and transported in an uncomplicated manner. Complex and/or angled geometries of circuit configurations can be contacted quite easily. The individual components of the neutral conductor are easy to connect, such as with the aid of screw connections.

In one advantageous development, the local neutral conductor is developed as a sheet-metal part shaped in such a way that it at least partially provides a housing for the capacitors forming the first and second capacitance, the local neutral conductor in particular forming a housing for the capacitors that constitute the first, second and fourth capacitance. This has the advantage that the sheet-metal part functions as a line and as a housing, which saves an additional line or an additional housing. In other words, material can be saved and the impact on the environment is reduced.

In one advantageous development, the local neutral conductor mechanically holds the capacitors and functions as heat sink for the connected capacitors. This is advantageous in that an additional heat sink and/or an additional mechanical holding device for the capacitors can be omitted. This allows the circuit configuration to be implemented in a cost-advantageous manner.

Important features of the present invention in the system of capacitors, each having at least one electrical connection, are that a separate terminal of each capacitor is connected to a modular housing component in an electrically conductive manner, the capacitors are interconnected in an electrically conductive manner by means of the modular housing component, the modular housing component at least partially forming a housing for the capacitors.

This is advantageous insofar as the system of capacitors may be implemented in a compact and space-saving manner. Components such as connector cables are able to be saved by the dual use of the modular housing component as electrically conductive connection of the capacitors and as housing. The system of capacitors is therefore able to be produced in a cost-effective manner. At the same time, resources are able to be saved, which protects the environment.

In one advantageous development, the system includes a circuit configuration. This has the advantage that the system of capacitors may be used as a filter system. The performance reliability of a circuit having the system of capacitors is therefore able to be improved.

In one advantageous development, the modular housing component serves as heat sink for the capacitors. This provides the advantage that an additional heat sink can be omitted, which reduces the required material and is better for the environment.

In one advantageous refinement, at least two capacitors are connected in parallel. This has the advantage that the capacitance of the circuit can be increased by the parallel connection of the capacitors and the current loading capacity of the circuit be improved. This increases the performance reliability.

In one advantageous development, a modular housing in two or more pieces is formed from the modular housing component and from at least one additional modular housing component. This is advantageous insofar as the modular housing components can be produced in an uncomplicated manner, using die bending technology, for example. By connecting two modular housing components it is therefore possible to produce a closed modular housing, in particular.

In one advantageous embodiment, the capacitors are connected to the modular housing components by force-locking, the securing means used for the force-locking connection, especially a screw or a threaded stud, simultaneously functioning as electrical contacts of the individual terminal of the capacitor. This is advantageous insofar as an additional connector cable can be omitted.

In one advantageous development, two capacitors are situated opposite each other on two sides of a connecting sheet-metal part, the connecting sheet-metal part electrically connecting the capacitors to a phase line of a single- or multiphase alternating voltage source. This has the advantage that the capacitor system is able to be developed in an especially compact manner.

In one advantageous development, the capacitors are connected to the connecting sheet-metal part and to each other in force-locking or form-locking manner by means of a single connection element, which preferably is developed as a screw or a threaded stud. This has the advantage that a single connection element can be used, which saves components. The system of capacitors is therefore able to be produced in a cost-effective manner.

In one advantageous development, the connection element functions as the electrical connection of two terminals of the capacitors in each case. In this context it is advantageous that the capacitors can be switched in parallel, so that the capacitance of a circuit is able to be increased and the current load capacity of the circuit improved.

In one advantageous development, a converter housing surrounds the modular housing, which has at least the modular housing component, in a housing-forming manner, the converter housing being at least partially made of metal, and the converter housing being connected to the ground potential in an electrically conductive manner. This has the advantage that the modular housing can be designed to be current-carrying, so that additional insulation, especially an insulating sheath, of the modular housing is able to be omitted. In one advantageous development, the converter housing includes additional circuit components, which likewise have a current-carrying modular housing.

In one advantageous development, an additional filter, especially a capacitor, which is connected to the converter housing and the modular housing in an electrically conductive manner, is disposed between the converter housing and the modular housing. This has the advantage that compensating or interference currents are able to be dissipated in a reliable manner.

In one advantageous development, the modular housing is mechanically held in the converter housing with the aid of an electrically insulating holding part. This is advantageous insofar as the modular housing can be designed to carry current, the grounded converter housing protecting the user from an electric shock.

In one advantageous development, at least one capacitor has a connecting part, to which a resistor can be connected, the resistor in particular being able to be plugged into the capacitor. This is advantageous insofar as a series circuit of capacitor and resistor is implementable in an uncomplicated manner. A further filter, which filters out interference, is able to be integrated into the system of capacitors with the aid of this series circuit.

In one advantageous development, at least one capacitor includes an insulation section, which is disposed between a terminal of the capacitor and the modular housing component, the insulation section being electrically insulating, in particular. This provides the advantage that the terminal of the capacitor can easily be insulated from the modular housing. The mechanical construction needs to be modified only slightly, so that the insulation section can easily also be provided retroactively.

In one advantageous development, the insulation section radially surrounds the terminal of the capacitor, the insulation section in particular completely surrounding the terminal of the capacitor in the circumferential direction in a radial clearance region. This advantageously allows the insulation section to be implemented in a simple and reliable manner, such as in the form of a perforated disk, and the terminal can be routed through the hole. Given sufficient radial clearance, a reliable insulation is achievable.

In one advantageous development, a resistor and/or a coil are/is connected to the terminal of the capacitor and to the modular housing component in an electrically conductive manner. This has the advantage that the resistor and/or the coil are/is easily connectable to the terminal of the capacitor in an electrically conductive manner with the aid of a screw. A second terminal of the resistor and/or the coil is connectable to the modular housing component by means of a further screw. Thus, a series circuit of capacitor, resistor and/or coil and modular housing is able to be implemented in an uncomplicated manner.

In one advantageous development, the connecting sheet-metal parts for connecting to the phase lines are electrically conductively connected to a particular phase line of the alternating voltage network by means of screws. This is advantageous insofar as the connection is particularly secure with regard to mechanical loading.

In one advantageous development, the modular housing components and/or connecting sheet-metal parts are developed as stamped and bent parts from sheet metal, especially as copper, aluminum or steel stamped sheet-metal parts. This has the advantage that the modular housing components can be produced in an uncomplicated manner, which makes the manufacture especially cost-effective.

In one advantageous embodiment, the capacitors are developed as foil capacitors, especially as foil capacitors featuring an axial design. This has the advantage that the foil capacitors are standard components and easily obtainable.

In one advantageous embodiment, the capacitors are developed as ceramic capacitors, especially ceramic capacitors featuring an axial design. This is advantageous insofar as the ceramic capacitors are especially suitable for high-frequency applications.

In one advantageous embodiment, each capacitor has an inductance that is lower than 10 nH. This is advantageous insofar as the entire system of capacitors has especially low inductance, so that the filter system filters out a greater frequency range in the range of high frequencies.

BRIEF DESCRIPTION OF THE DRAWINGS

FIG. 7 shows another exemplary embodiment of the system of capacitors according to the invention, in an oblique view, a modular housing component having been blanked out.

FIG. 8 shows the rear side of the further exemplary embodiment of the system of capacitors according to the invention, in an oblique view, a modular housing component having been blanked out.

DETAILED DESCRIPTION

Figure 1:
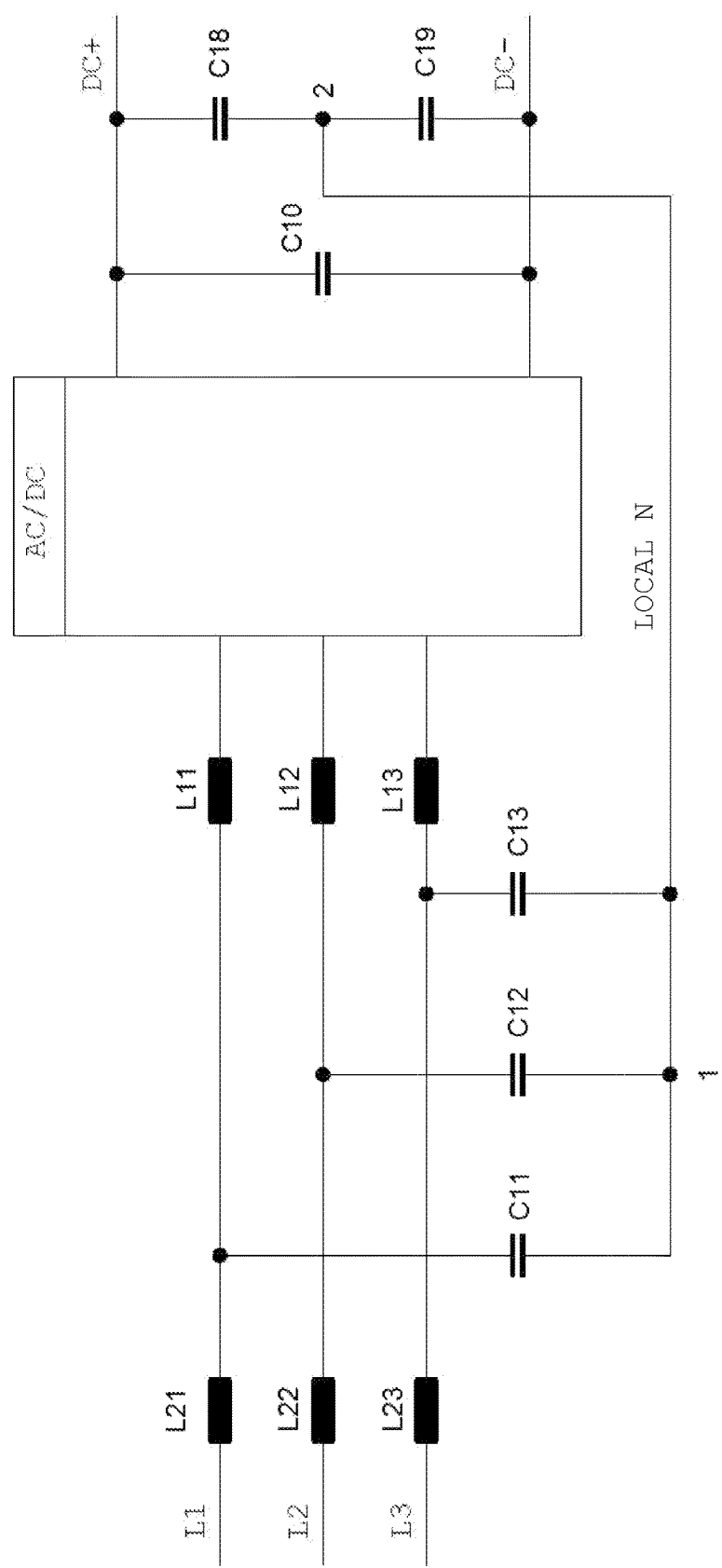
FIG. 1 shows a circuit configuration according to the present invention in a schematic form.

The circuit configuration shown in FIG. 1 for a converter includes terminals (L1, L2, L3), especially input terminals, for a first, second and third network phase line of a three-phased alternating voltage source, the network phase lines also being referred to as phase lines in the following text. An inductance (L21, L22, L23) is post-connected to these terminals (L1, L2, L3) in each phase line. These inductances (L21, L22, L23) can also be referred to as input-side inductances.

A system of first capacitances (C11, C12, C13) is post-connected to the inductances (L21, L22, L23). A line branches off from each phase line, which leads via one of the first capacitances (C11, C12, C13) in each case from the three inductances (L21, L22, L23) to a common star point 1. The first capacitances (C11, C12, C13) can also be referred to as star capacitances.

Using the first capacitors (C11, C12, C13), voltage spikes that are created in the circuit configuration or would be injected from the network are filtered out.

The inductances (L21, L22, L23) cause a decoupling of the first capacitors (C11, C12, C13) from the network current, especially from capacitances existing in the supply network, i.e., in the alternating current source. This decoupling suppresses resonant vibrations of the current between the first capacitors (C11, C12, C13) and the capacitors present in the supply network, in that the resonant frequency is shifted to excitation-free frequency ranges. Additional inductances (L11, L12, L13) as work throttle or actuator throttle for the converter are disposed in each phase line downstream from the branching to first capacitors (C11, C12, C13).

As a result, this system of first capacitors (C11, C12, C13) and inductances (L11, L12, L13, L21, L22, L23) is also referred to as power-line filter.

Downstream from the inductances (L11, L12, L13) is an AC/DC converter, which transforms the injected alternating voltage into a direct voltage.

Diodes, which transmit either only current having a positive voltage or only current having a negative voltage and block a current of the respective other voltage, are situated in the AC/DC converter. Two diodes per current phase are used, the incoming supply being situated between the two diodes, one of the diodes blocking current having a negative voltage and the other diode blocking current having a positive voltage. In this way, both half-waves of each phase are used for the rectification in each case.

In further exemplary embodiments according to the present invention, transistors or thyristors are situated in the AC/DC converter, IGBT transistors being preferably used. The transistors are switched in synchrony with the frequency of the alternating voltage, so that only current having a positive voltage or only current having a negative voltage passes through the transistor.

The energy of the direct voltage is temporarily stored in a third capacitance C10 downstream from the AC/DC converter.

A center tap 2, which is connected in an electrically conductive manner to star point 1 by means of a local neutral conductor (LOCAL N), is disposed between two second capacitances (C18, C19). The second capacitances (C18, C19) and center tap 2 are therefore connected in a series configuration. The second capacitances (C18, C19) can be referred to as divider capacitances.

Third capacitance C10 is at least ten times higher than each of the second capacitances C18 and C19. As a result, third capacitance C10 is also called the main intermediate circuit capacitance.

Downstream from the second capacitances (C18, C19) are terminals (DC+, DC−) for a connection to further components such as a converter of a converter for actuating a motor, for example. Terminal DC+ connects the further components to the upper intermediate circuit potential, and terminal DC− connects the further components to the lower intermediate circuit potential.

Third capacitance C10 is switched in parallel with the AC/DC converter. Third capacitance C10 is likewise connected in parallel with the series circuit of the second capacitances (C18, C19) and center tap 2.

The connection between star point 1 and center tap 2 by means of the local neutral conductor (LOCAL N) relieves the loading of ground cables, because high-frequency interference currents between the intermediate circuit and the inductances (L11, L12, L13) are balanced and do not flow into a ground cable. Such interference currents are caused by stray capacitances, which are present in every real component.

The local neutral conductor (LOCAL N) can be developed as a cable and/or as a sheet-metal part. A sheet-metal part is especially advantageous because it has considerably lower inductance than a cable. The sheet-metal part is at least partially able to be developed in such a way that it forms a housing for the first and second capacitances (C11, C12, C13, C18, C19).

In further exemplary embodiments of the present invention, the inductances (L21, L22, L23) are developed as multiphase choke. The three windings of the inductances (L21, L22, L23) are developed on three interconnected magnetic cores.

In further exemplary embodiments of the present invention, no inductances (L21, L22, L23) are used. This variant is especially . . . in a network terminal having long connector cables or in a network supply that is low in harmonic oscillations. In this case the inductances (L21, L22, L23) can be omitted.

In further exemplary embodiments according to the present invention, the circuit device is used in a recovery unit, e.g., a recovery unit in a converter which is supplied with regenerative energy from an electromotor. In this case a direct current is transformed into a multiphase alternating current, the voltage curve of the individual phases preferably being sinusoidal.

The current flow in a recovery unit takes place in the opposite direction to the exemplary embodiments described heretofore. The terminals (DC+, DC−) act as input terminals for a direct current. Arising voltage spikes are dissipated by center tap 2 between the two capacitances (C18, C19). The downstream third capacitance C10 temporarily stores the electrical energy of the voltage intermediate circuit.

An AC/DC converter transforms the direct current into a multiphase alternating voltage. Transistors or thyristors are provided in the AC/DC converter for this purpose, preferably IGBT transistors. The transistors are switched on and off at a clock pulse that is generated in the AC/DC converter itself, so that an alternating current of random frequency is generated, preferably of the network frequency of 50 Hz or 60 Hz.

The clocking of the AC/DC converter is controlled and/or regulated by a microcontroller (not shown).

Situated downstream from the AC/DC converter in each phase line of the alternating voltage are inductances (L11, L12, L13) as filters. Downstream from these inductances in each phase line is a branch to a separate first capacitance (C11, C12, C13). These first capacitances (C11, C12, C13) are used to dissipate voltage spikes to a common star point 1.

Star point 1 and center tap 2 are connected to each other in an electrically conductive manner by means of a local neutral conductor (LOCAL N). This connection prevents potential jumps between the direct voltage range having third capacitance C10 and the alternating voltage range having the inductances (L11, L12, L13).

Downstream from the branchings to the first capacitances (C11, C12, C13) are additional inductances (L21, L22, L23) in each phase line. These inductances (L21, L22, L23) are used to prevent resonant oscillations between the first capacitances (C11, C12, C13) and inductive reactive currents of the network.

In further exemplary embodiments according to the present invention, the described recovery unit is used in a converter for solar modules in order to transform a direct voltage that is generated by the solar modules into an alternating voltage that is able to be injected into an alternating voltage network. Single-phase or multiphase alternating voltages can be generated in this manner.

Figure 2:
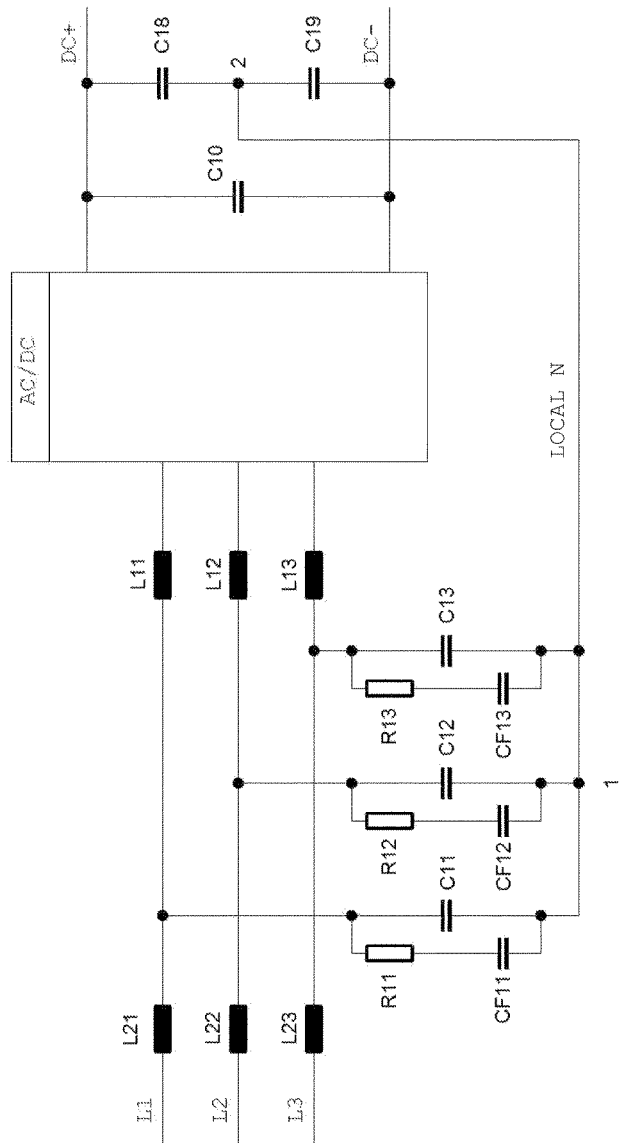
FIG. 2 shows an additional exemplary embodiment of the circuit configuration according to the present invention in a schematic form.
Figure 3:
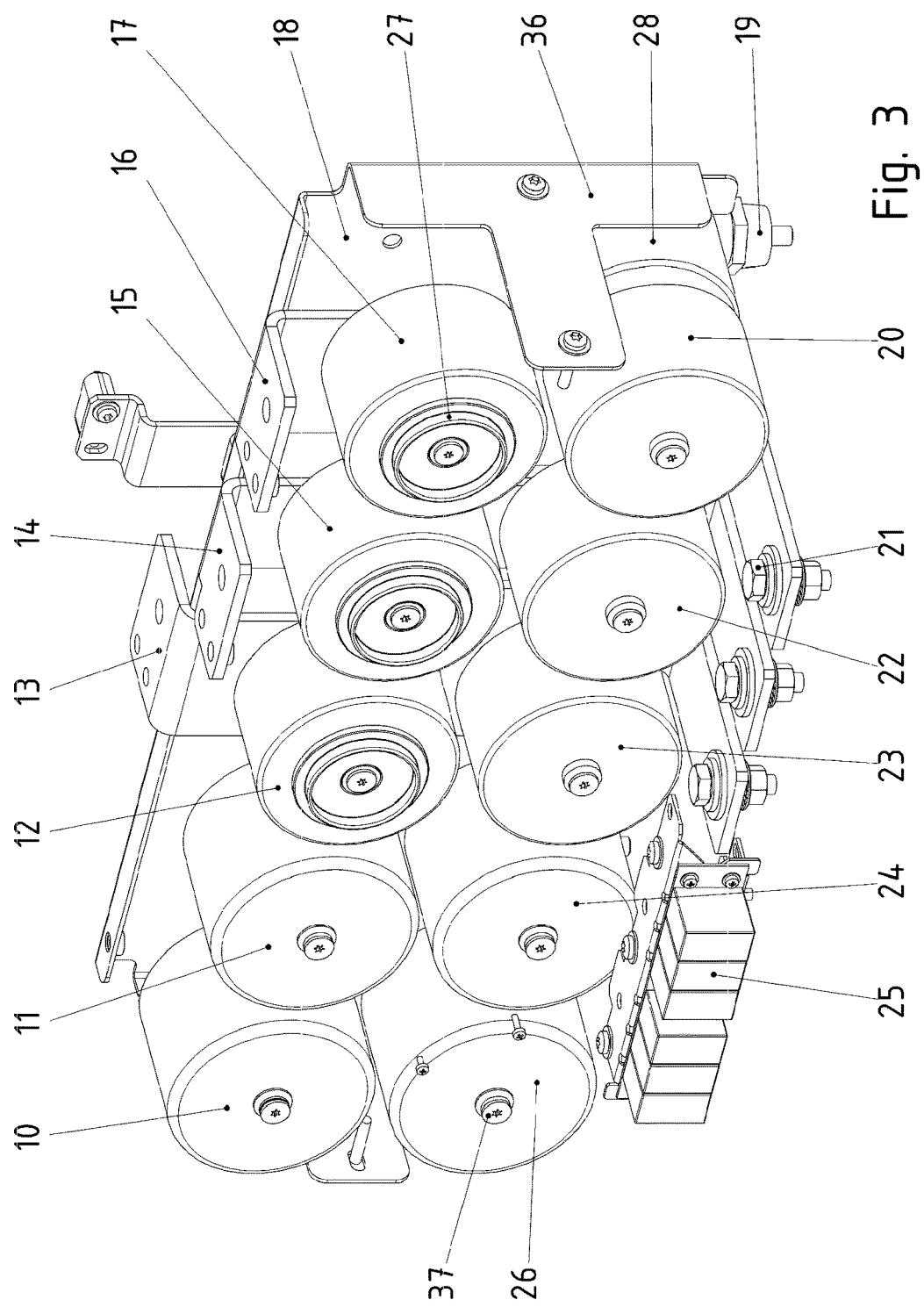
FIG. 3 shows a system of capacitors according to the invention, in an oblique view, a first modular housing component having been blanked out.
Figure 4:
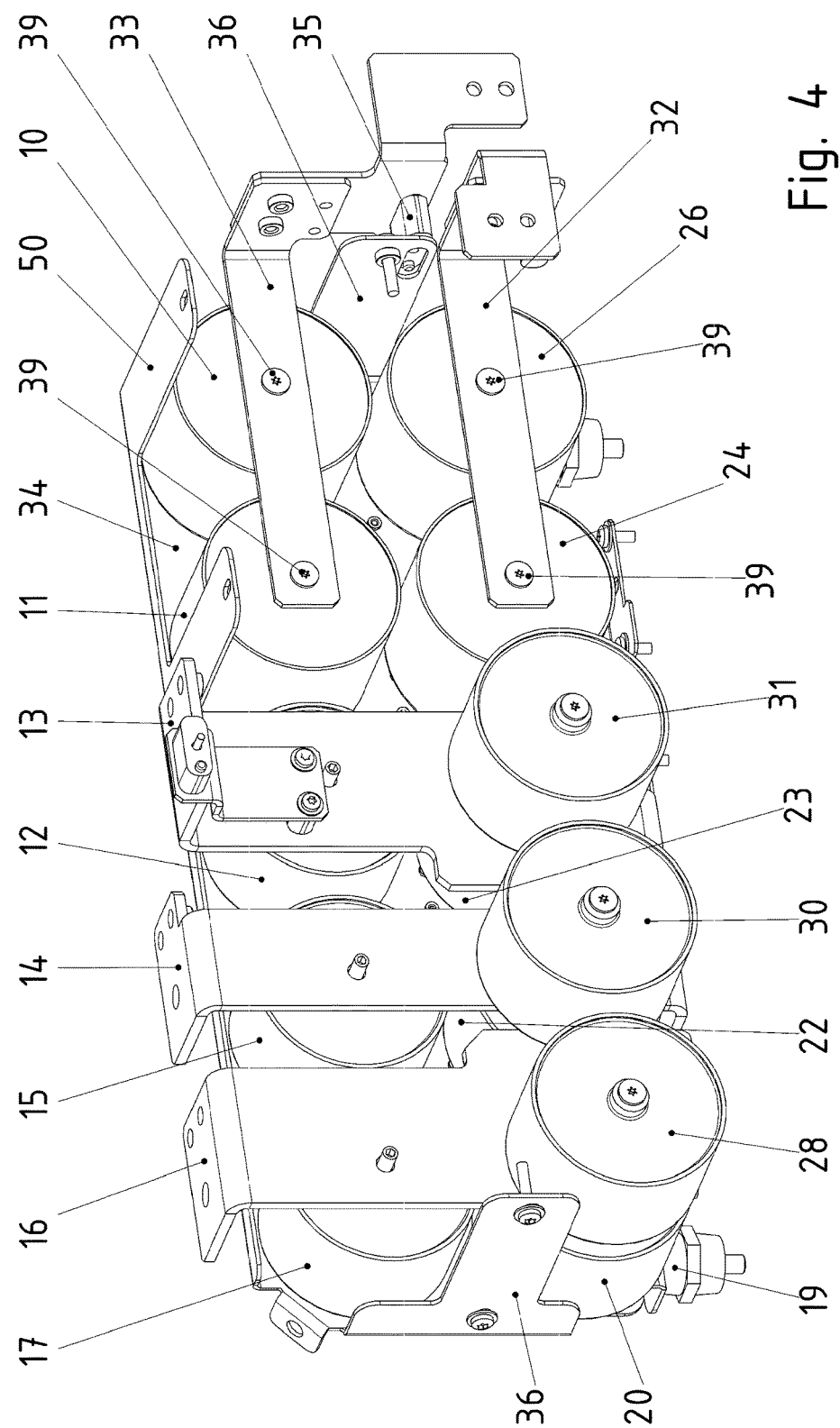
FIG. 4 shows the rear side of the system of capacitors according to the invention, in an oblique view, a second modular housing component having been blanked out.
Figure 5:
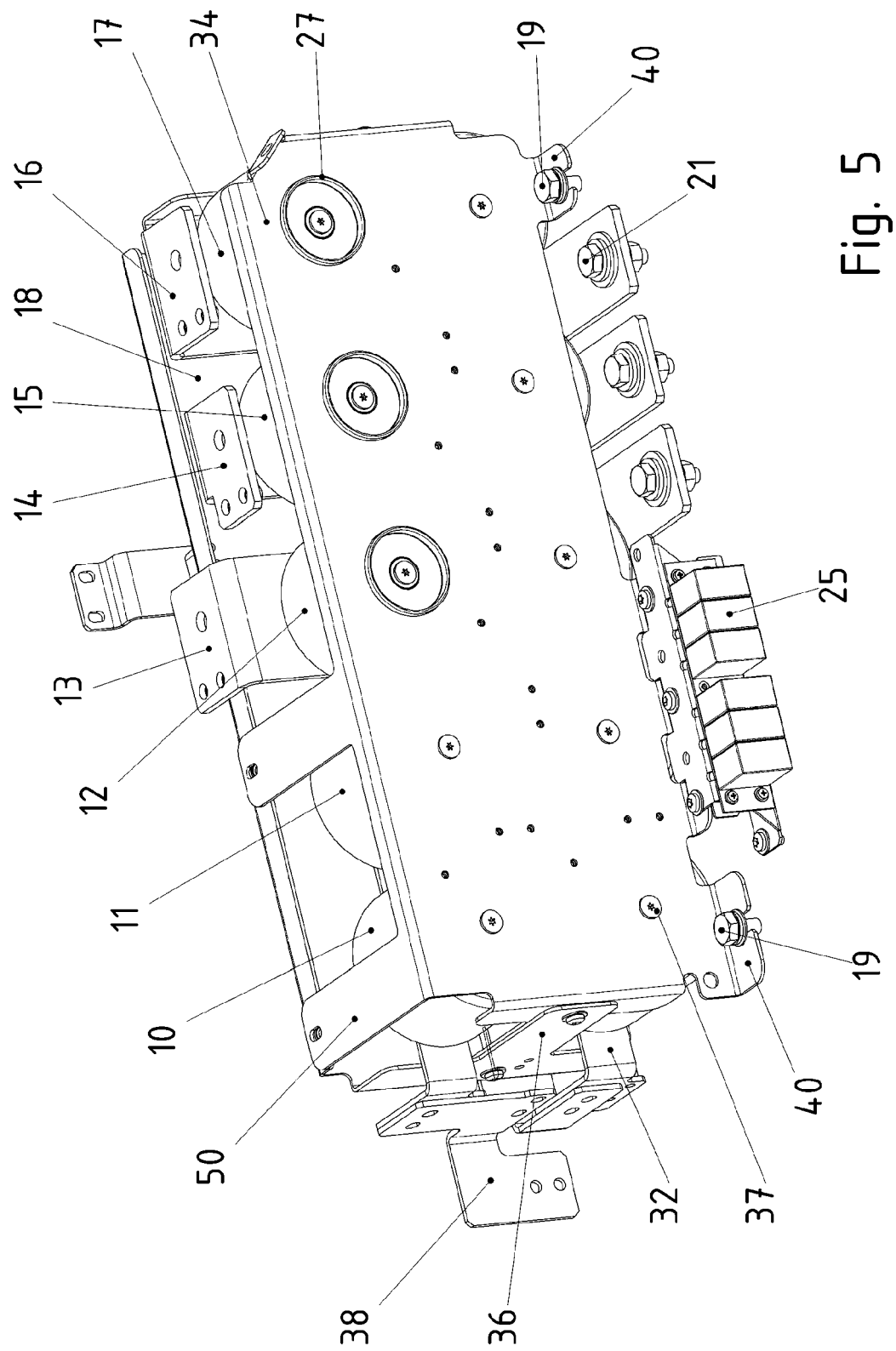
FIG. 5 shows the system of capacitors according to the invention, in an oblique view, the first modular housing component being displayed.
Figure 6:
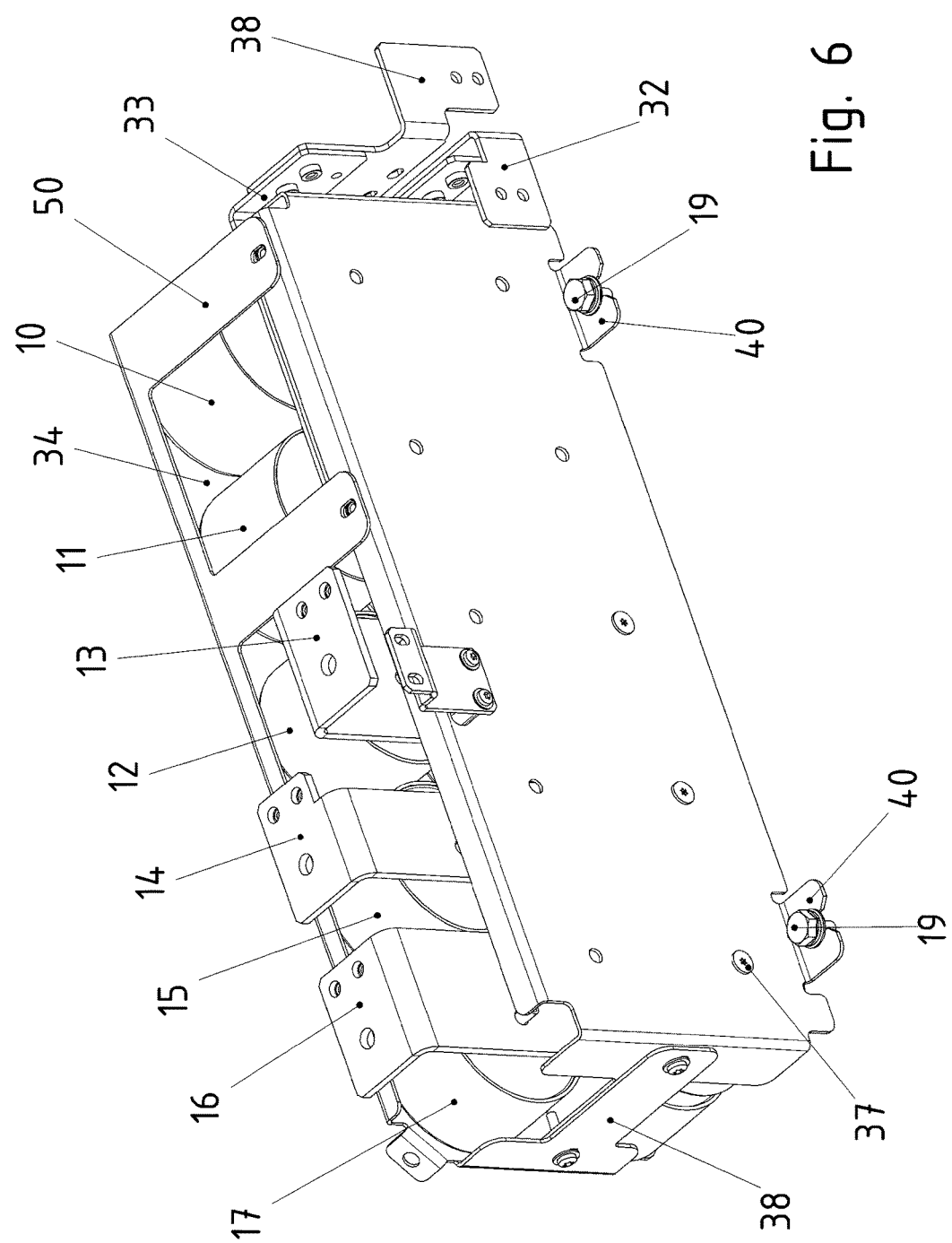
FIG. 6 shows the rear side of the system of capacitors according to the invention, in an oblique view, the second modular housing component being displayed.

The circuit configuration shown in FIG. 2 is a variant of the previously described circuit configuration according to FIG. 1. Here, a fourth capacitance CF11 is connected in parallel with first capacitance C11. A fourth capacitance CF12 is disposed so as to be connected in parallel to first capacitance C12. A fourth capacitance CF13 is provided, which is connected in parallel with first capacitance C13.

The capacitances of the fourth capacitances (CF11, CF12, CF13) are smaller in each case than the capacitances of the first capacitances (C11, C12, C13). In particular the capacitances of the fourth capacitances (CF11, CF12, CF13) are smaller than one half of the capacitance of the first capacitances (C11, C12, C13) and greater than one tenth of the capacitance of the first capacitances (C11, C12, C13). The fourth capacitances (CF11, CF12, CF13) are each greater than one fourth of the capacitance of the first capacitances (C11, C12, C13).

The fourth capacitances (CF11, CF12, CF13) are situated so as to be connected in series with a resistor (R11, R12, R13) in each case. Resonant oscillations in the circuit configuration are damped with the aid of this RC parallel series circuit. The fourth capacitances (C11, C12, C13) can also be referred to as filter capacitances.

In additional exemplary embodiments according to the present invention, a further device for improving the electromagnetic compatibility is connected in an electrically conductive manner to the local neutral conductor (LOCAL N). This device is preferably a filter 25, such as a further capacitance that is connected to the earth potential or a frame potential in an electrically conductive manner, or an inductance.

This further device for improving the electromagnetic compatibility is able to be realized at a low technical outlay, especially also in case of converters that operate with high outputs, in particular outputs of more than 100 kW. The low capacitance or inductance of the device for improving the electromagnetic compatibility is made possible by the excellent filter characteristics of the circuit configuration itself.

FIGS. 3 through 6 show a system of capacitors according to the present invention, which are interconnected according to the circuit diagram illustrated in FIG. 2. Second capacitance C18 is formed by two capacitors 10 and 11 disposed in a parallel connection. Second capacitance C19 is formed by two capacitors 24 and 26 disposed in a parallel connection.

First capacitance C11 is formed by two capacitors 20, 28 connected in parallel. First capacitance C12 is formed by two capacitors 22, 30 connected in parallel. First capacitance C13 is formed by two capacitors 23, 31 connected in parallel.

Fourth capacitance CF11 is formed by capacitor 12 and connected in parallel with the capacitors (23, 31). Connected in series with capacitor 12 is a resistor (not shown), which is electrically interposed between capacitor 12 and star point 1.

Fourth capacitance CF12 is formed by capacitor 15 and connected in parallel with capacitors (22, 30). Connected in series with capacitor 15 is a resistor (not shown), which is electrically interposed between capacitor 15 and star point 1.

Fourth capacitance CF13 is formed by capacitor 17 and connected in parallel with capacitors 20, 28. Connected in series with capacitor 17 is a resistor (not shown), which is electrically interposed between capacitor 17 and star point 1.

The first, second and fourth capacitances (C11, C12, C13, C18, C19, CF11, CF12, CF13) are preferably implemented as foil capacitors and/or ceramic capacitors. The foil capacitors and/or ceramic capacitors preferably have an axial form.

An axial form means that a capacitor has a cylindrical housing, and an electrical terminal of the capacitor is situated at each end face of the cylindrical housing.

The first, second and fourth capacitances (C11, C12, C13, C18, C19, CF11, CF12, CF13) are preferably developed as low-inductance capacitances, and the inductance of each first, second or fourth capacitance (C11, C12, C13, C18, C19, CF11, CF12, CF13) is less than 10 nH, in particular. Each foil capacitor and/or ceramic capacitor is cylindrical. The two electrical terminals of each foil capacitor and/or ceramic capacitor are disposed on the individual end faces. The terminals are developed as threaded bores in the foil capacitor and/or ceramic capacitor. The foil capacitors and/or ceramic capacitors are therefore contactable by means of screws and/or threaded studs.

Two individual first terminals of capacitors 10 and 11 are interconnected in electrically conductive and force-locking manner by a connecting sheet-metal part 33, each capacitor 10 and 11 being screw-fitted to connecting sheet-metal part 33. A screw 39 is guided through a recess in connecting sheet-metal part 33 for this purpose and screwed into a thread in capacitor 10 or 11. Capacitors 10 and 11 are disposed next to each other on the connecting sheet-metal part 33.

Two first terminals of capacitors 24 and 26 in each case are interconnected in electrically conductive and force-locking manner with the aid of a further connecting sheet-metal part 32. Each capacitor 24 and 26 is preferably connected by screws to connecting sheet-metal part 32. A screw 39 is guided through a recess in connecting sheet-metal part 32 for this purpose and screwed into a thread in capacitor 24 or 26.

Three first terminals of the three capacitors (17, 20, 28) in each case are interconnected in electrically conductive and force-locking manner with the aid of a further connecting sheet-metal part 16.

Three first terminals of the three capacitors (15, 22, 30) in each case are likewise interconnected in an electrically conductive and force-locking manner with the aid of a further connecting sheet-metal part 14.

Three first terminals of the three capacitors (12, 23, 31) in each case are likewise interconnected in an electrically conductive and force-locking manner with the aid of a further connecting sheet-metal part 13.

Two capacitors 17 and 20 are disposed on an end face of connecting sheet-metal part 16, and a third capacitor 28 is situated on the opposite end face of connecting sheet-metal part 16. The force-locking connection of the capacitors (17, 20, 28) to connecting sheet-metal part 16 is preferably developed as a screw connection. A screw or a threaded stud is guided through a recess in connecting sheet-metal part 16 and screwed together with the capacitors (17, 20, 28).

In particular, both capacitors 20 and 28 are disposed across from each other on two sides of connecting sheet-metal part 17 and interconnected with the aid of a single threaded stud (not shown), which is guided through a single recess in connecting sheet-metal part 17.

Capacitors 12, 15 and 17 each include an insulation section 27. Insulation section 27 surrounds a terminal 37 of respective capacitor 12, 15 and 17; in particular, insulation section 27 surrounds terminal 37 radially, and in particular, insulation section 27 surrounds terminal 37 completely in the circumferential direction in a radial clearance range. In this case the radial direction is defined as the radial direction of the particular cylindrical capacitor 12, 15, 17, terminal 37 being disposed in the center of a side surface of the cylinder.

Insulation section 27 is developed as electrically insulating section and preferably developed as a plastic component.

In the area of capacitors 12, 15 and 17, modular housing component 34 has recesses, in particular circular recesses, through which individual terminal 37 and insulation section 27 are guided. Insulation section 27 is disposed radially between modular housing component 34 and individual terminal 37, so that terminal 37 is electrically insulated from modular housing component 34.

A resistor (not shown) or a coil (not shown) is able to be connected to terminal 37 in an electrically conductive manner on the one side and to modular housing component 37 on the other side.

The system of capacitors is disposed inside a modular housing. The modular housing has at least one first modular housing component 18 and a second modular housing component 34.

The modular housing components (18, 34) and/or the connecting sheet-metal parts (13, 14, 16, 32, 33) are developed as stamped and bent parts and preferably made from steel sheet, aluminum sheet and/or copper sheet.

The modular housing is in turn accommodated in a converter housing (not shown). The modular housing is situated in such a way that it is electrically insulated from the converter housing.

The modular housing is essentially block-shaped, and modular housing components 18 and 34 are used as side areas of the modular housing. Modular housing components 18 and 34 thus are essentially developed as rectangular planar sheet-metal parts having connecting sections (36, 50) that are disposed at a right angle thereto. The connecting sections (36, 50) can be used for the friction-locked and electrically conductive connection of the two modular housing components 18 and 34. To do so, a screw is guided through a recess in two connecting sections 36 and screwed together with the aid of a nut.

A separate second connector of the capacitors (10, 11, 20, 22, 23, 24, 26) is connected to modular housing component 34 in an electrically conductive and friction-locked manner.

For this purpose a screw 37 is guided through a recess (not shown) in modular housing component 34 and screwed into the individual connector of the capacitors (10, 11, 20, 22, 23, 24, 26). A washer is situated between modular housing component 34 and the head of screw 37.

A separate second connector of the capacitors (28, 30, 31) is connected to modular housing component 18 in an electrically conductive and friction-locked manner. For this purpose a screw 37 is guided through a recess (not shown) in modular housing component 18 and screwed into the individual connector of the capacitors (28, 30, 31). A washer is situated between modular housing component 34 and the head of screw 37.

As a result, the modular housing having modular housing components 18 and 34 and connecting sections (36, 50) are connected in an electrically conductive manner to the second connectors of the capacitors (10, 11, 20, 22, 23, 24, 26, 28, 30, 31). The modular housing is therefore used as star point 1 and/or as local neutral conductor (LOCAL N).

The modular housing components (18, 34) are preferably developed as stamped parts, and the connecting sections (36, 50) are integrally formed with the particular modular housing component (18, 34) and deflected at a right angle by bending. Thus, a third side area of the modular housing is formed with the aid of the connecting sections (36, 50). That is to say, the modular housing is partially open.

At least one capacitor is situated between the connecting sheet-metal parts (13, 14, 16) and the modular housing components (18, 34). Connecting section 36 is frictionally connected to connecting sheet-metal part 33, and an insulation means 35 is situated between connecting section 36 and connecting sheet-metal part 33. Connecting sheet-metal part 33 and connecting section 36 thus are situated in such a way that they are electrically insulated from each other.

As a result, the modular housing components (18, 34) integrally formed with connecting section 36 are also electrically insulated from connecting sheet-metal part 33. With the modular housing components (18, 34) the entire modular housing is disposed in electrical insulation from the connecting sheet-metal parts (32, 33).

A connection element 38 is connected to connecting sheet-metal part 33 in a force-locking and electrically insulating manner. With the aid of connection element 38, connecting sheet-metal part 33 is able to be connected to an intermediate circuit capacitor (not shown) in an electrically conductive manner.

Using a further screw 21 in each case, each phase line is connected to one of the sheets (16, 14, 13) in an electrically conductive manner.

The modular housing having the system of capacitors is situated in a superposed converter housing, which is not shown and includes a converter (not shown) having the system of capacitors. The modular housing is able to be frictionally connected to the superposed converter housing. Screws 19 are preferably provided, which connect a connecting section 40 of the modular housing component (18 or 34) to the superposed converter housing. The force-locking connection of the modular housing to the superposed converter housing is developed to be electrically insulating.

The converter housing is at least partially produced from metal and connected in an electrically conductive manner to the earth potential or the frame potential.

In addition, a filter 25 is provided, which is connected to the modular housing in an electrically conductive manner. This filter 25 is used to improve the electromagnetic compatibility of the system of capacitors. Filter 25, for example, is developed as a further capacitor, which is grounded. Filter 25 is preferably connected to the grounded converter housing in an electrically conductive manner.

FIGS. 7 and 8 show a further exemplary embodiment of the system of capacitors according to the present invention. Second capacitances C18 and C19 are not included in the system. In this exemplary embodiment, the system thus includes only first and fourth capacitances C11, C12, C13, CF11, CF12 and CF13.

First capacitance C11 is once again formed by two capacitors (85, 88). Switched in parallel with the capacitors (85, 88) is a capacitor 70, which forms fourth capacitance CF11.

First capacitance C12 is once again formed by two capacitors (84, 89). Switched in parallel with the capacitors (84, 89) is a capacitor 73, which forms fourth capacitance CF12.

First capacitance C13 is once again formed by two capacitors (80, 82). Switched in parallel with the capacitors (80, 82) is a capacitor 76, which forms fourth capacitance CF13.

The three capacitors (70, 85, 88) are interconnected by a connecting sheet-metal part 71 in each case. The first terminals of the capacitors (70, 85, 88) are connected to the individual connecting sheet-metal part 71, especially in an electrically conductive and friction-locked manner. The friction-locked connection is preferably a screw connection.

The three capacitors (73, 84, 89) are interconnected by a connecting sheet-metal part 72 in each case. The first terminals of the capacitors (73, 84, 89) are connected to the individual connecting sheet-metal part 72, especially in an electrically conductive and friction-locked manner. The friction-locked connection is preferably a screw connection.

The three capacitors (76, 80, 82) are interconnected by a connecting sheet-metal part 75 in each case. The first terminals of the capacitors (76, 80, 82) are connected to the individual connecting sheet-metal part 75, especially in an electrically conductive and friction-locked manner. The friction-locked connection is preferably a screw connection.

In this exemplary embodiment as well, the system of capacitors is surrounded in a housing-forming manner by two modular housing components 77 and 86, which interconnect the particular second terminals of the capacitors (80, 82, 84, 85, 88, 89) in an electrically conductive manner.

The two modular housing components (77, 86) are interconnected in an electrically conductive and force-locking manner by means of connecting sections (79, 87). Connecting section 79 is formed in one piece with modular housing component 77. Connecting section 87 is integrally formed with modular housing component 86.

A resistor (not shown) is electrically disposed between the capacitors (70, 73, 76) and modular housing component 86.

The exemplary embodiment shown in FIGS. 7 and 8 is able to be used in a variety of ways as capacitor star point circuit.

In a first operating mode, the converter according to the present invention acts as rectifier, i. e., as AC/DC converter, between its alternating voltage terminal side and its unipolar terminal side, or as inverter, i.e., DC/AC converter, in a second operating mode. In the first operating mode, the electrical power current is directed from the alternating voltage side to the unipolar terminal side, and reversed in its direction in the second operating mode.

LIST OF REFERENCE NUMERALS

1 star point
2 center tap

AC/DC converter
C10 capacitance
C11 capacitance
C12 capacitance
C13 capacitance
C18 capacitance
C19 capacitance
DC+ terminal, upper intermediate circuit potential
DC− terminal, lower intermediate circuit potential
L1 terminal, first phase line
L2 terminal, second phase line
L3 terminal, third phase line
L11 inductance
L12 inductance
L13 inductance
L21 inductance
L22 inductance
L23 inductance
LOCAL N local neutral conductor
CF11 capacitance
CF12 capacitance
CF13 capacitance
R11 resistor
R12 resistor
R13 resistor
10 capacitor
11 capacitor
12 capacitor
13 connecting sheet-metal part
14 connecting sheet-metal part
15 capacitor
16 connecting sheet-metal part
17 capacitor
18 modular housing component
19 screws
20 capacitor
21 screws
22 capacitor
23 capacitor
24 capacitor
25 filter
26 capacitor
27 insulation section
28 capacitor
30 capacitor
31 capacitor
32 connecting sheet-metal part
33 connecting sheet-metal part
34 modular housing component
35 insulation means
36 connecting section
37 screw
38 connection element
39 screw
40 connecting section
50 connecting section
70 capacitor
71 connecting sheet-metal part
72 connecting sheet-metal part
73 capacitor
74 insulation means
75 connecting sheet-metal part
76 capacitor
77 modular housing component
78 connecting part
79 connecting section
80 capacitor
81 screw
82 capacitor
83 screw
84 capacitor
85 capacitor
86 modular housing component
87 connecting section
88 capacitor
89 capacitor

The invention claimed is:

1. A circuit configuration, comprising:
a converter that includes an alternating voltage connection and a unipolar connection on one of an input side and an output side, the alternating voltage connection being connected to phase lines;
first capacitances situated between one of the phase lines and a common star point in each case;
a series circuit of second capacitances connected to the unipolar connection and having a center tap, wherein the common star point is connected in an electrically conductive manner to the center tap in a voltage intermediate circuit;
at least one third capacitance connected directly in parallel with the series circuit of second capacitances; and
a series circuit including a fourth capacitance and a respective resistor, the fourth capacitance and resistor disposed in parallel with each first capacitance.

2. The circuit configuration as recited in claim 1, wherein the series circuits of second capacitances, fourth capacitances, and resistors are substantially identical, and wherein (a) the capacitances of the fourth capacitances being smaller than one half of the capacitance of the first capacitance and greater than one tenth of the capacitance of the first capacitance, or (b) the capacitance of the fourth capacitance being smaller than one half of the capacitance of the first capacitance and greater than one fourth of the capacitance of the first capacitance.

3. A circuit configuration, comprising:
a converter that includes an alternating voltage connection and a unipolar connection on one of an input side and an output side, the alternating voltage connection being connected to phase lines;
first capacitances situated between one of the phase lines and a common star point in each case;
a series circuit of second capacitances connected to the unipolar connection and having a center tap, wherein the common star point is connected in an electrically conductive manner to the center tap in a voltage intermediate circuit; and
at least one third capacitance connected directly in parallel with the series circuit of second capacitances;
wherein: each phase line includes a series circuit of inductances, each phase line includes a center tap situated between two inductances, and the inductances disposed on a network side from the center tap is one of a line inductance and a series circuit of a line inductance and a filter choke inductance.

4. The circuit configuration as recited in claim 3, wherein the alternating voltage connection is for one of a multiphase input-side alternating voltage source and an output-side alternating voltage source.

5. The circuit configuration as recited in claim 3, wherein the unipolar connection is a direct voltage connection for the voltage intermediate circuit.

6. The circuit configuration as recited in claim 3, wherein the phase lines include three phase lines, the phase lines including inductances.

7. The circuit configuration as recited in claim 3, wherein one of the first capacitances is situated between each phase line and the common star point.

8. The circuit configuration as recited in claim 3, wherein each of the first capacitances is of equal size.

9. The circuit configuration as recited in claim 3, wherein the common star point is connected in an electrically conductive manner to the center tap in a voltage intermediate circuit via a local neutral conductor.

10. The circuit configuration as recited in claim 3, wherein the series circuit of second capacitances includes two second capacitances of equal size.

11. The circuit configuration as recited in claim 3, wherein the inductances are inductances of a network filter.

12. The circuit configuration as recited in claim 3, wherein a capacitance of the third capacitance is greater than a capacitance of each of the second capacitances.

13. The circuit configuration as recited in claim 3, wherein a capacitance of the third capacitance is greater by at least a factor of ten than a capacitance of each of the second capacitances.

14. The circuit configuration as recited in claim 9, wherein the local neutral conductor is connected to earth potential in an electrically conductive manner by a further filter.

15. The circuit configuration as recited in claim 14, wherein the further filter includes a capacitor.

16. The circuit configuration as recited in claim 9, wherein the local neutral conductor is a sheet-metal part connected to a connection of the first and second capacitances in an electrically conductive manner in each case, and wherein the local neutral conductor mechanically holds the capacitors forming or having the individual capacitances, wherein the local neutral conductor has multiple parts.

17. The circuit configuration as recited in claim 9, wherein the local neutral conductor includes a sheet-metal part shaped in such a way that the local neutral conductor at least partially forms a housing for the capacitors that form the first capacitance.

18. The circuit configuration as recited in claim 9, wherein the local neutral conductor forms a housing for the capacitors that make up the first, second, and fourth capacitances.

19. The circuit configuration as recited in claim 9, wherein the local neutral conductor mechanically holds the capacitors and functions as a heat sink for the capacitors connected thereto.

20. A system of capacitors, each having at least one electrical terminal, comprising:
a circuit configuration for a converter having a filter system, comprising:
a converter that includes an alternating voltage connection and a unipolar connection on one of an input side and an output side, the alternating voltage connection being connected to phase lines,
first capacitances situated between one of the phase lines and a common star point in each case,
a series circuit of second capacitances connected to the unipolar connection and having a center tap, wherein the common star point is connected in an electrically conductive manner to the center tap in a voltage intermediate circuit, and
at least one third capacitance connected directly in parallel with the series circuit of second capacitances,
wherein one terminal of each capacitor is connected to a modular housing component in an electrically conductive manner, wherein the capacitors are interconnected in an electrically conductive manner by the modular housing component, and wherein the modular housing component at least partially forms a housing for the capacitors; and
wherein each phase line includes a series circuit of inductances, each phase line includes a center tap situated between two inductances, and the inductances disposed on a network side from the center tap is one of a line inductance and a series circuit of a line inductance and a filter choke inductance.

21. The system of capacitors as recited in claim 20, wherein the modular housing component functions as a heat sink for the capacitors.

22. The system of capacitors as recited in claim 20, wherein at least one of:
at least two capacitors are connected in parallel, and
a modular housing in at least two pieces is formed from the modular housing component and at least one further modular housing component.

23. The system of capacitors as recited in claim 20, wherein
the capacitors are connected to the modular housing component in a force-locking manner via a securing element that simultaneously functions as an electrical contact of individual terminals of the capacitors.

24. The system of capacitors as recited in claim 23, wherein the securing includes one of a screw and a threaded stud.

25. The system of capacitors as recited in claim 20, wherein two capacitors in each case are disposed opposite each other on two sides of a connecting sheet-metal part, the sheet-metal part electrically connecting the capacitors to a phase line of a single-phase or multiphase alternating voltage source, the capacitors being connected to the connecting sheet-metal part and to each other in at least one of a force-locking manner and a form-locking manner by a single connection element functioning as an electrical connection of individual second terminals of the capacitors.

26. The system of capacitors as recited in claim 25, wherein the single connection element includes one of a screw and a threaded stud.

27. The system of capacitors as recited in claim 20, further comprising:
a converter housing surrounding the modular housing having at least the modular housing component in a housing-forming manner, the converter housing being at least partially made of metal, the converter housing being connected to the ground potential in an electrically conductive manner, wherein an additional filter is disposed between the converter housing and the modular housing, which is connected to the converter housing and the modular housing in an electrically conductive manner, the modular housing being mechanically held in the converter housing with the aid of an electrically insulating holding part.

28. The system of capacitors as recited in claim 27, wherein the additional filter is a capacitor.

29. The system of capacitors as recited in claim 20, wherein at least one capacitor has an insulation section disposed between a terminal of the capacitor and the modular housing component, the insulation section being designed to be electrically insulating, the insulation section radially surrounding the terminal of the capacitor and surrounding the terminal completely in a circumferential direction in a radial clearance region, wherein at least one of a resistor and a coil is connected to the terminal of the capacitor and to the modular housing component in an electrically conductive manner.

30. The system of capacitors as recited in claim 20, wherein at least one of:
connecting sheet-metal parts for connecting to the phase lines are connected in an electrically conductive manner to a particular phase line of the alternating voltage network by screws, wherein at least one of the modular housing component and the connecting sheet-metal parts are developed as stamped and bent parts made from metal sheet,
the capacitors include foil capacitors, and
the capacitors include ceramic capacitors.

31. The system of capacitors as recited in claim 30, wherein the stamped and bent parts include one of stamped copper sheet parts, aluminum sheet parts, and steel sheet parts.

32. The system of capacitors as recited in claim 30, wherein the foil capacitors have an axial design.

33. The system of capacitors as recited in claim 30, wherein the ceramic capacitors have an axial design.

34. The system of capacitors as recited in claim 30, wherein each capacitor has an inductance that is smaller than 10 nH.

* * * * *